Oct. 21, 1952 — E. P. CRIM — 2,614,253
STITCHING MACHINE
Filed Jan. 24, 1951 — 2 SHEETS—SHEET 1
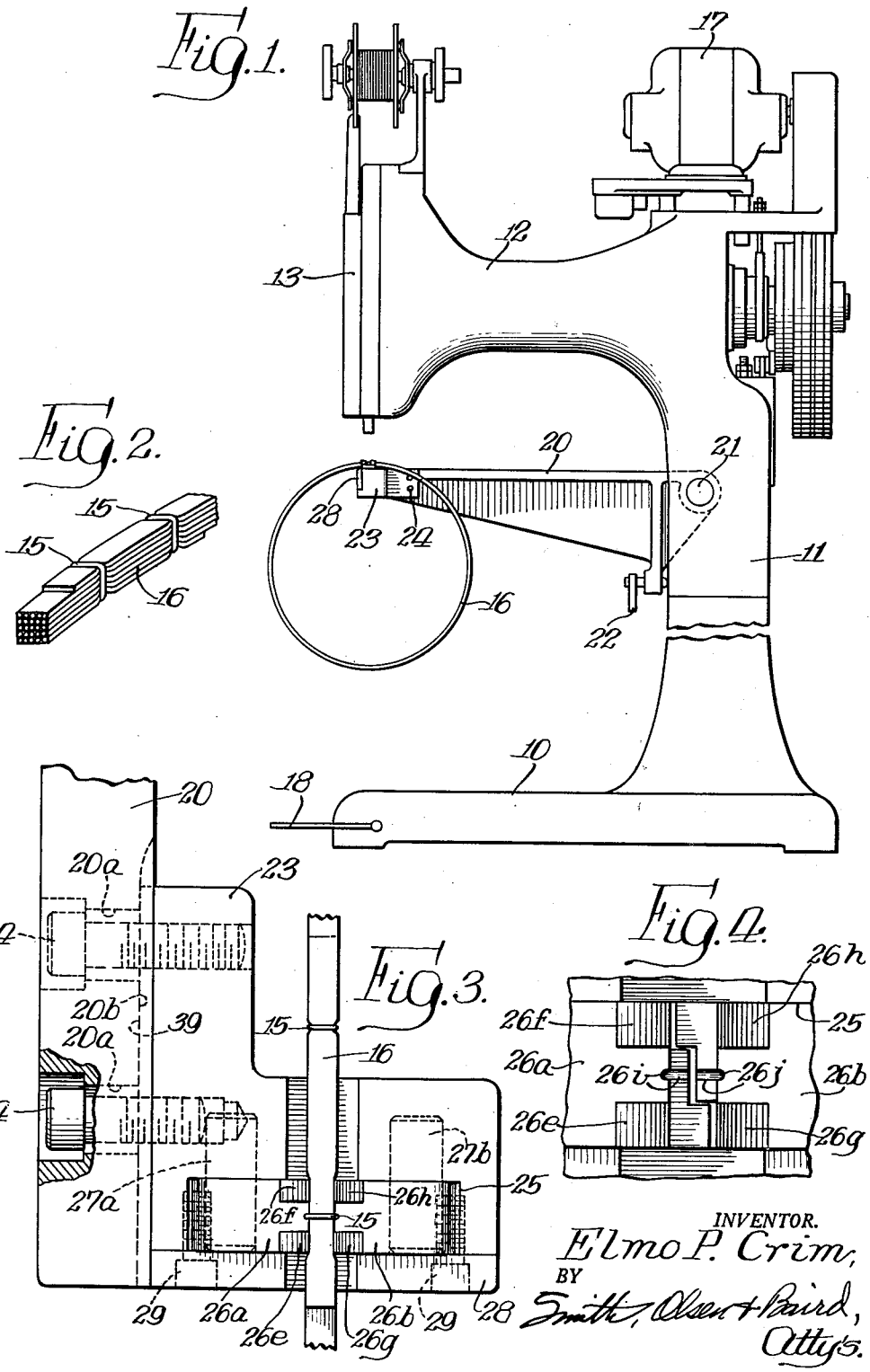
INVENTOR.
Elmo P. Crim,
BY Smith, Olsen & Baird,
Attys.

Oct. 21, 1952 E. P. CRIM 2,614,253
STITCHING MACHINE
Filed Jan. 24, 1951 2 SHEETS—SHEET 2
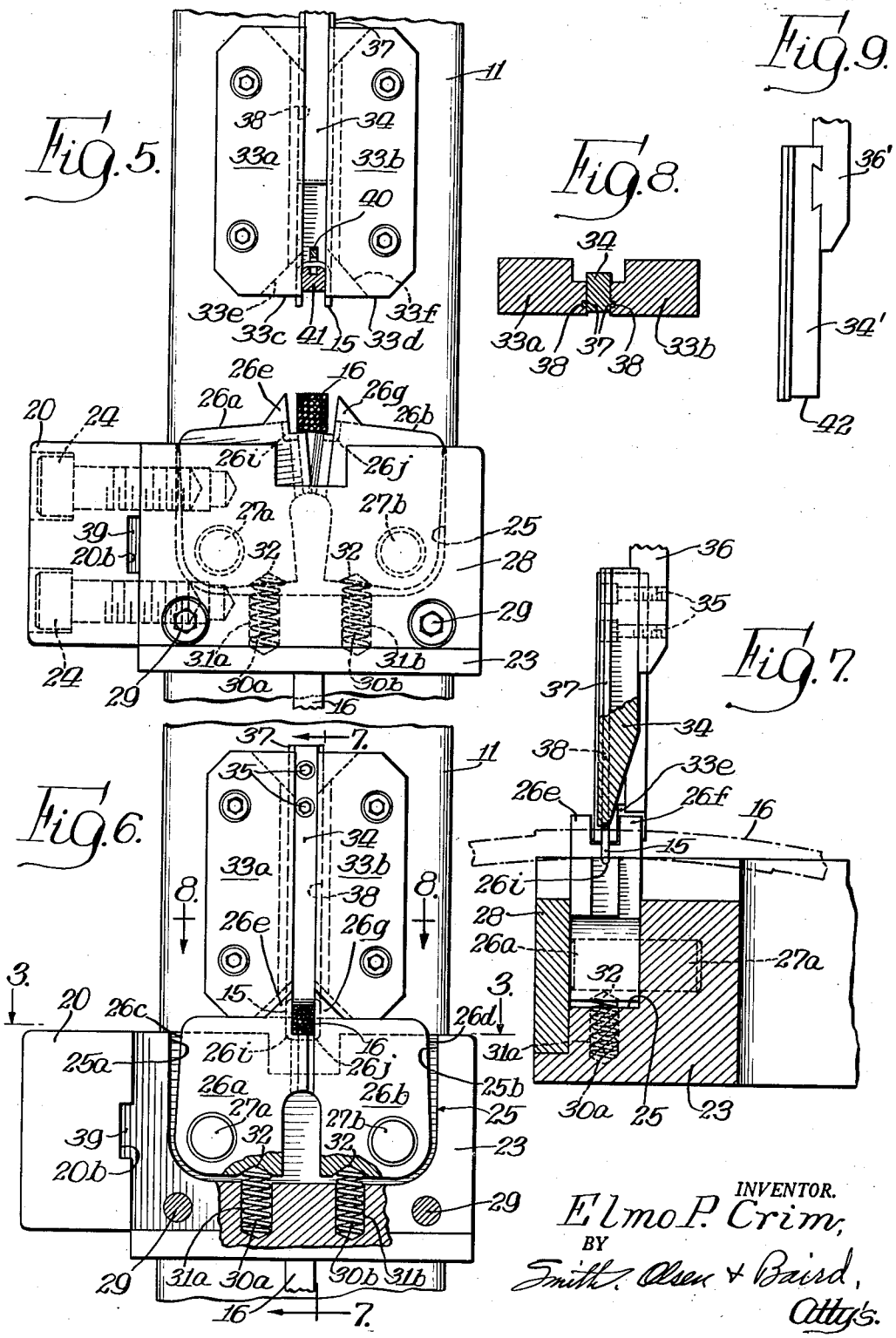
INVENTOR.
Elmo P. Crim,
BY
Smith, Olsen & Baird,
Atty's.

Patented Oct. 21, 1952

2,614,253

UNITED STATES PATENT OFFICE 2,614,253

STITCHING MACHINE

Elmo P. Crim, Evergreen Park, Ill., assignor to Acme Steel Company, Chicago, Ill., a corporation of Illinois Application January 24, 1951, Serial No. 207,521

13 Claims. (Cl. 1—177)

The present invention relates in general to improvements in stitching machines of the type commonly employed to form U-shaped staples to drive the formed staples through one or more pieces of material, and to clinch the ends of the staples in order to secure the pieces of material together; and, more particularly, the present invention relates to improvements in the forming and clinching means for such machines which are arranged to clinch the U-shaped staples around resilient, compressible work pieces.

In the manufacture of automobile tire casings, it is customary to provide a relatively stiff ring around the inner circumferential edge of each of the tire walls in order to add strength to the tire casing and in order to make certain that the tire casing will remain in place on the metal tire rim of a wheel when the inner tube within the tire casing is inflated. The above noted ring generally contains a bundle of wires which are held in place during the molding of the tire casing and are commonly referred to as the bead of the tire.

One form of tire bead includes a plurality of closely spaced individual or braided wires which are entirely covered and held together by a coating of unvulcanized rubber to form a continuous flat ribbon or strip. This flat ribbon is wound into a ring of several layers having a predetermined thickness and having an inside diameter corresponding approximately to the inner diameter of the tire casing into which the bead is to be placed. When the tire bead is thus formed, the inner and outer free ends of the flat ribbon forming the ring are held in place by means of several wrappings of friction tape manually wound around the several convolutions or layers of the ring in the regions of the free ends.

Thereafter, the completed tire bead is assembled with the tire casing and vulcanized in place in the usual tire mold. During the vulcanizing process, the rubber in the bead and the casing blend together to secure the wires of the bead tightly in place and to form the complete tire casing.

It has been found, however, that the taping of the free ends of the flat ribbon bead is unsatisfactory since it fails to retain the ends securely in place because of the heat and pressure of the vulcanizing process. As a result thereof, the several layers of the flat ribbon bead are permitted to expand in diameter and the several layers separate from each other due to the spring tension of the coiled wires. When this occurs, the diameter of the bead is incorrect for the size of the tire that is being vulcanized and the convolutions of the several layers of wires in the flat ribbon bead are loosely instead of closely spaced. This of course, results in the manufacture of an imperfect tire.

Accordingly, it is the principle object of the present invention to overcome the above mentioned difficulties by providing an improved arrangement for securely fastening the free ends of the flat ribbon forming the tire casing bead which is not only more reliable but also more economical.

It is another object of the invention to provide an improved automatic stitching machine which is arranged to secure several stacked layers of work material, such as a tire bead, by means of metal staples formed of rolled or flat wire.

It is another object of the invention to provide in an automatic stitching machine of the type noted, improved forming and clinching apparatus for compressing the sides, as well as the top and bottom, of a compressible work piece, for example a tire bead, and for encircling the compressed work piece with a staple. With this arrangement the compressed material of the work piece may expand to its normal position as soon as the staple forming and clinching operation is completed, leaving the encircling staple embedded in and flush with the outer surface of the work material. This is of particular value in conjunction with the formation of tire casing beads since it eliminates any sharp protrusions therefrom which might tear or break through and thereby weaken the fabric material of the tire casing which surrounds the tire bead during the molding operation.

The invention, both as to its organization and method of operation, together with further objects and advantages thereof, will best be understood by reference to the following specifications taken in connection with the accompanying drawings, in which:

Figure 1 shows a side elevation of a stitching machine embodying the present invention;

Fig. 2 shows an enlarged perspective view of a portion of a compressible work piece, for example a tire casing bead, with the clinched staples encircling and embedded in the compressible work piece;

Fig. 3 shows a view taken along line 3—3 of Fig. 6, with the staple driver and former omitted, and illustrates the manner in which the sides of a compressible work piece are compressed by the staple clinching jaws;

Fig. 4 shows an enlarged view similar to that of Fig. 3, with certain parts including the work piece omitted in order more clearly to show the staple clinching groove in the staple clinching jaws and the manner in which the jaws match with one another in their closed position;

Fig. 5 shows an enlarged left-hand view of the stitching machine anvil arm and a portion of the former and the driver of the stitching head on the machine of Fig. 1, and illustrates the open position of the staple clinching jaws and the position of the work piece therein preliminary to the driving of a staple;

Fig. 6 shows a view similar to that of Fig. 5, with certain parts omitted, and illustrates the closed or clinching position of the staple clinching jaws and the compressed position of the work piece;

Fig. 7 shows a view taken along line 7—7 of Fig. 6, with certain parts broken away, and illustrates the positions of the stitching head former and driver with respect to the staple clinching jaws during the staple clinching operation;

Fig. 8 shows a view taken along line 8—8 of Fig. 6; and

Fig. 9 shows a view similar to that of Fig. 7, with certain parts omitted, of an alternate form of a stitching head driver and illustrates the manner of securing the same to the associated member.

As illustrating in the drawings, the present invention is embodied in a stitching machine having a base 10 provided with an upwardly extending pedestal 11 from which there extends a horizontal stitching arm 12 carrying at its outer end, the stitching head 13 in which there is mounted for vertical movement, a driver bar by which the staples 15 are adapted to be driven and clinched around the work piece 16 which, for example, may be the tire bead previously described. The stitching machine is provided with a motor 17 for controlling the machine to perform a single stapling operation each time the foot treadle 18 is momentarily depressed. The above noted stitching machine, while illustrated generally in the drawings, is not herein described because it does not itself form a part of the present invention. For a full disclosure of a stitching machine of the character noted, to which the present improved forming clinching arrangement is applicable, reference may be had to the Joseph T. Wright Patent No. 2,226,598, granted December 31, 1940.

Basically, the stitching machine illustrated in the drawings is the same as the stitching machine illustrated in the above noted patent except that in the present machine an improved anvil arm and staple clinching mechanism has been substituted for the post type anvil and the blade type anvil illustrated in the patent.

Referring now to Fig. 1, it will be seen that a rigid anvil arm 20 is pivotally mounted in the trunnions 21 journalled in the wall of the stitching machine pedestal 11. Adjacent to the wall of the pedestal 11, a handled screw 22 is threaded through a portion of the anvil into engagement with the wall of the pedestal 11. Due to the length and weight of the anvil arm 20, the free end thereof may be adjusted to pivot about the trunnions 21 by turning of the handled screw 22 in order to position the clinching mechanism provided at the free end of the arm 20 relative to the stitching head 13.

Mounted adjacent to the free end of the anvil arm 20 and below the stitching head 13, there is an L-shaped block 23 as is best illustrated in Fig. 3, which is secured to the free end of the arm 20 by means of four screws 24. The L-shaped block 23 is provided with a recess 25 in which two staple clinching jaws 26a and 26b are pivotally mounted on pins 27a and 27b, as is best illustrated in Figs. 5 and 6. A front cover plate 28 is secured to the L-shaped block 23 by means of a pair of screws 29 to form one wall of the recess 25 and to retain the pins 27a and 27b in position in the cooperating holes in the block 23.

The two coil compression springs 30a and 30b in the recesses 31a and 31b in the lower surface of the block 23 cooperate with the depressions or dimples 32 provided in the lower surface of the staple clinching jaws 26a and 26b in order normally to urge the jaws 26a and 26b to their open positions, as is best illustrated in Fig. 5, with the left-hand clinching jaw 26a rotated about the associated pin 27a in a counterclockwise direction and the right-hand clinching jaw 26b rotated about the associated pin 27b in a clockwise direction. In the open position, the side surfaces 26c and 26d of the respective jaws 26a and 26b are urged against the upper portions of the side surfaces 25a and 25b of the recess 25 in the block 23.

In order to compress a compressible work piece 16, the clinching jaw 26a is provided with two spaced-apart upstanding triangular members 26e and 26f and the clinching jaw 26b is provided with two similar spaced-apart upstanding triangular members 26g and 26h. These upstanding members function to press against opposite sides of work piece 16 to compress the same therebetween when the jaws 26a and 26b are moved to a closed position so that a staple 15 may be clinched around the work piece while it is held in the compressed position. For this purpose, the jaws 26a and 26b are respectively provided with aligned staple clinching grooves 26i and 26j as is shown in Figs. 4 and 5. In considering the clinching jaws 26a and 26b it should be noted that they are identically shaped so that they may be interchanged with each other. It should also be noted that the cooperating inner surfaces of the jaws are stepped so that they are partially meshed in their open position to provide a surface for supporting the work piece 16 and so that they are fully meshed in their closed position to provide a substantially flat surface therebetween for the work piece 16 at the time the staple is driven in place and clinched, as is best illustrated in Fig. 4.

The present stitching machine is provided with a pair of formers 33a and 33b, which are somewhat similar to the formers provided in the stitching machine of the previously mentioned patent, except that they are respectively provided with diagonal cut-outs 33e and 33f at their inner lower ends in order to provide adequate clearance for the upstanding members 26f and 26h on the rear portions of the clinching jaws 26a and 26b. The formers 33a and 33b are also arranged in exactly the same manner at their opposite ends so that they may be interchanged with each other and inverted in the event the end portion of either one is broken. A driver 34, which is tapered at its lower end as seen in Fig. 7, is secured at its upper end by means of two screws 35 to a driver bar 36 of the type disclosed in the previously noted patent. As is described in that patent, the driver bar 36 controls the reciprocal vertical movement of the driver 34. The driver 34 is provided with the tongues 37 on opposite sides thereof which cooperate with the staple receiving grooves 38 in the formers 33a and 33b and slide therein during the reciprocal vertical movement of the driver 37.

In the event a narrow work piece is to be encircled by a staple of the stitching machine, a different set of clinching jaws 26 will be substituted for those illustrated in the drawings since the upstanding members on the two jaws must be spaced-apart from each other substantially the same distance as the distance between the legs of the staple which is to encircle the narrow work piece. Since smaller staples will also be required, corresponding changes must be made in the spacing between the formers 33a and 33b, and in addition, the driver 34 must be reduced in size so that it will fit between the formers and slide therebetween. In any event, the modified driver may be so narrow that if screws are utilized to secure it to the driver bar 36 they may be too small to withstand the force necessary to perform the stapling operation. In Fig. 9 a modified arrangement for securing the driver to the driver bar is shown. As illustrated, a modified driver 34' is dovetailed to the driver bar 36' in order rigidly and securely to fasten the parts together. In addition thereto, the lower end 42 of the driver 34' may be flat instead of tapered. Consequently, the lower end 42 of the driver 34' will not tend to cut into the upper surface of the work piece 16 during the stapling operation.

In the previous description it was pointed out that the L-shaped block 23 is secured to the free end of the anvil arm 20 by means of four screws 24. It should be noted that the holes 20a in the anvil arm 20 for receiving the screws 24 are slotted to permit adjustment of the L-shaped block 23 longitudinally along the arm 20. Consequently, the staple clinching grooves 26i and 26j in the staple clinching jaws 26a and 26b may be located directly under the staple receiving grooves 38 in the formers 33a and 33b. In order to permit the above described adjustment to be made readily, a tongue 39 formed along the left-hand side of the L-shaped block 23 is slidably mounted in a cooperating groove 20b formed in the right-hand side of the anvil arm 20 as is best illustrated in Fig. 3.

In considering the operation of the stitching machine, it will be assumed that the motor 17 is in operation. The operator of the machine may now place the work piece 16 in the stapling position between the upstanding members 26e—26f on the clinching jaw 26a and the corresponding members 26g—26h on the opposite clinching jaw 26b which are in the open position illustrated in Fig. 5. It should be understood that the work piece 16 may be of many different kinds of compressible material but for the purpose of this description it is assumed that the work piece 16 comprises the previously described compressible tire casing ring or bead, a portion of which is illustrated in Fig. 2.

In order to control the stitching head 13 of the machine, the operator of the machine momentarily depresses the foot treadle 18 and thereby causes the machine to perform a single staple forming and driving operation in the manner fully described in the previously noted patent. During the staple forming operation by the stitching head 13, an inverted U-shaped wire staple is formed as the formers 33a and 33b move downwardly toward the staple clinching jaws 26a and 26b. During the downward movement of the formers 33a and 33b, the staple 15 is held by a gripper 40 in a mandrel 41 of the stitching head with the downwardly pointing legs of the inverted U-shaped staples in slidable engagement with the staple receiving grooves 38 in the formers 33a and 33b as is shown in Fig. 5. The formers 33a and 33b continue the downward movement under control of the stitching head 13 and when the lower surfaces 33c and 33d of the formers contact the upper surfaces of the respective clinching jaws 26a and 26b they are rotated inwardly, against the compression of the springs 30a and 30b, until they assume the closed position illustrated in Fig. 6. Thus, it will be seen that the lower surfaces 33c and 33d of the formers function as separate cams and that the engaged upper surfaces of the respective jaws 26a and 26b function as cam followers to rotate the jaws inwardly on the pins 27a and 27b.

It should be noted, however, that the rear upwardly extending members 26f and 26h on the jaws 26a and 26b mesh with the diagonally cut-out portions 33e and 33f in the formers 33a and 33b and that the associated upwardly extending members 26e and 26g on the jaws 26a and 26b are in front of the front surfaces of the formers 33a and 33b when formers reach the position shown in Fig. 6. Since the work material 16 is positioned between the upwardly extending members 26e—26f and 26g—26h when the associated jaws 26a and 26b are rotated inwardly toward each other, the sides of the compressible work piece 16 are compressed sufficiently, as is illustrated in Figs. 3 and 6, to allow the legs of the staple 15 to straddle the work piece 16 during the stapling operation.

The driver 34 is now driven downwardly by the stitching head 13 to release the staple 15 from the gripper 40 and mandrel 41 and to engage the crown portion of the staple 15. The staple is now driven downwardly, guided in the staple receiving grooves 38 in the formers 33a and 33b, until the legs of the staple straddle the compressed work piece and enter the upper portions of the staple clinching grooves 26i and 26j in the respective clinching jaws 26a and 26b. As the legs of the staple 15 reach the lower portions of these grooves, they are turned inwardly toward each other along the lower surface of the work piece 16.

Due to the force exerted by the driver 34 in its downward stroke the compressible work piece 16 is also compressed in a vertical direction as seen in Fig. 6 and the staple 15 is tightly clinched in place encircling the work piece. After this operation is performed, the machine completes its single cycle of operation by returning the various parts thereof to the position illustrated in Fig. 5. Consequently, the withdrawal of the driver 34 and the formers 33a and 33b, permits the compression springs 30a and 30b to expand and thereby return the clinching jaws 26a and 26b to their open positions. The work piece 16 is now fully released and expands to its original shape except that the encircling staple 15, having been tightly clinched around the compressed work piece, remains embedded therein and substantially flush with the expanded surfaces of the work piece 16, as is clearly illustrated in Fig. 2. This is a feature which is desirable and extremely important in the formation of tire beads.

The above described stapling and clinching operations may be repeated as many times as required in order securely to hold the work piece 16. On a tire bead, however, the stapling operation should be performed near the free ends of the flat ribbon forming the tire bead ring and as many additional times as is deemed necessary to hold the bead in shape.

It will be apparent that a stitching machine constructed and arranged in the manner described above, compresses the compressible material of a work piece sufficiently to permit the formers and the legs of staple to straddle the material without damaging the sides of the material during the stapling operation.

Although one form of the invention has been shown and described by way of illustration, it will be understood that it may be constructed in various other embodiments which come within the scope of the appended claims.

I claim:

1. In a stitching machine for driving metal staples comprising a stitching head having staple driving means, an anvil arm having a free end extending beneath said stitching head, clinching means carried by the free end of said arm having a first position for supporting a work piece and operative to a second position to compress the work piece, means movable towards said clinching means and carried by said stitching head for operating said clinching means from said first position to said second position, said driving means being movable toward said clinching means for encircling the compressed work piece with a staple.

2. In a stitching machine for driving metal staples comprising a stitching head having staple driving means, an anvil arm having a free end extending beneath said stitching head, clinching means carried by the free end of said arm having a first position for supporting a work piece and operative to a second position to compress the work piece, means movable towards said clinching means and carried by said switching head during a staple stitching operation for actuating said clinching means from said first position to said second position, said driving means being movable toward said clinching means for driving a metal staple, and staple clinching grooves formed in said clinching means for clinching said driven staple around the compressed work piece.

3. In a stitching machine for driving metal staples comprising a stitching head having staple driving means, an anvil arm having a free end extending beneath said stitching head, movable jaws supported adjacent the free end of said arm having a normal open position for supporting a work piece and having an operated closed position for compressing the sides of the work piece, and means movable towards said jaws and carried by said stitching head for operating said jaws from said open position to said closed position, said driving means being movable toward said jaws for encircling the compressed work piece with a metal staple after said jaws are in said closed position.

4. In a stitching machine for driving metal U-shaped staples comprising a stitching head having staple driving means, an anvil arm having a free end extending beneath said stitching head, cooperating jaws supported at the free end of said arm, said jaws being normally urged away from each other and being operative toward each other to compress a compressible work piece placed therebetween, means movable towards said jaws and carried by said stitching head for operating said jaws to compress the work piece therebetween and for holding said work piece compressed, said driving means being movable toward said jaws by said stitching head for driving a staple, said work piece being compressed sufficiently to permit the legs of said staple to straddle the compressed work piece, and means formed in said jaws for clinching the legs of said staple toward each other on the underside of the work piece.

5. In a stitching machine for driving metal U-shaped staples comprising a stitching head having staple driving means, an anvil arm having a free end extending beneath said stitching head, a pair of movable clamping jaws supported at the free end of said arm, means normally urging said jaws away from each other, a support between said jaws carrying a compressible work assembly, and means movable towards said jaws and carried by said stitching head for moving said jaws toward each other to clamp and compress therebetween the compressible work assembly carried by said support, said driving means being movable toward said jaws by said stitching head for encircling said compressed work assembly with a staple in order to retain at least the portion of the work assembly encircled by the staple in the compressed condition.

6. In a stitching machine for driving metal U-shaped staples comprising a stitching head having staple driving means, an anvil arm supported at one end on said machine and having a free end extending beneath said stitching head, a clinching jaw having first and second movable members supported at the free end of said arm, said first and second members normally urged away from each other to an open position and operative toward each other to a closed position, a work support between said members carrying a work assembly, and a former carried by said stitching head for operating said members to said closed position to clamp therebetween the sides of the work assembly carried on said support, said staple driving means being movable by said stitching head for driving an inverted U-shaped staple to encircle the clamped work assembly, whereby the crown portion of the staple engages the top surface of the work assembly and the legs of the staple engage the opposite sides of the work assembly and the ends of the legs of the staple engage the bottom surface of the work assembly.

7. In a stitching machine for driving metal staples comprising a stitching head having staple driving means, an anvil arm having a free end extending beneath said stitching head, clinching means having a first position and a second position supported on the free end of said arm below said stitching head, means normally urging said clinching means to said first position to support a work piece thereon, and a staple former movable towards said clinching means and carried by said stitching head for operating said clinching means from said first position to said second position in order to clamp the work piece, said staple driving means being movable toward said clinching means and cooperating with said clinching means in said second position for encircling the clamped work piece with a metal staple.

8. In a stitching machine for driving metal staples comprising a stitching head having staple driving means, an anvil arm having a free end extending beneath said stitching head, clinching means having a first position and a second position, a mounting block carrying said clinching means adjustably supported on the free end of said arm below said stitching head, means normally urging said clinching means to said first position to support a work piece thereon, a former movable toward said clinching means and carried by said stitching head for operating said clinching means from said first position to said second position in order to clamp the work piece, said staple driving means being movable toward said clinching means and cooperating with said clinching means in said second position for encircling the clamped work piece with a metal staple.

9. In a stitching machine for driving metal U-shaped staples comprising a stitching head having staple driving means, an anvil arm having a free end extending beneath said stitching head, a clamping device carried by the free end of said arm comprising two spaced apart members, each of said members including two spaced apart upwardly extending elements in alignment with each other and including a substantially horizontal work piece supporting portion, each of said member being pivotally mounted so that the two upwardly extending elements on each of said members are normally held away from each other to a first position and so that they are moveable toward each other to a second position with the horizontal portions of each of the members forming therebetween a support for a work piece, means carried by said stitching head for controlling said clamping device to move said members about the associated pivots toward each other from said first position to said second position with the work piece supported on said horizontal portions, whereby the two upwardly extending members on one of said elements engage one side of the work piece and the two upwardly extending members on the other of said elements engage the opposite side of the work piece to clamp the work piece therebetween in said second position, said staple driving means being movable by said stitching head for driving a staple, and means for clinching said staple around the clamped work piece between the two upwardly extending elements on each of the members of said clamping device.

10. In a stitching machine for driving metal U-shaped staples comprising a stitching head having a staple driving means, an anvil arm supported at one end and having a free end extending beneath said stitching head, a staple clinching mechanism comprising two elements movable away from and toward each other and having cooperating surfaces for supporting a compressible work assembly, said elements having vertical clamping surfaces for engaging and compressing opposite side walls of the compressible work assembly carried on said supporting surfaces as said elements are moved toward each other, a former having spaced apart staple grooves, means carried by said stitching head for driving said former downwardly against the top of said clinching mechanism in order to move said elements toward each other and compress the work assembly between said vertical clamping surfaces, said staple driving means being movable by said stitcher head for driving an inverted U-shaped staple downwardly in said former grooves until the crown of said staple engages the top surface of the work assembly and the legs of said staple straddle the compressed side walls of the work assembly, and clinching grooves formed in said two elements of said clinching mechanism for clinching the ends of said staple around the lower surface of the compressed work assembly.

11. In a stitching machine for driving metal U-shaped staples comprising a stitching head having staple driving means, an anvil arm supported at one end and having a free end extending beneath said stitching head, a staple clinching mechanism comprising two elements movable away from and toward each other and having cooperating surfaces for supporting a compressible work assembly, said elements having vertical clamping surfaces for engaging and compressing opposite side walls of the compressible work assembly carried on said supporting surfaces as said elements are moved toward each other, a former having spaced apart staple grooves, means carried by said stitching head for driving said former downwardly against the top of said clinching mechanism in order to move said elements toward each other and compress the work assembly between said vertical clamping surfaces, said staple driving means being movable by said stitcher head for driving an inverted U-shaped staple downwardly in said former grooves until the crown of said staple is driven into engagement with the top surface of the work assembly and the legs of said staple straddle the compressed side walls of the work assembly, clinching grooves formed in said two elements of said clinching mechanism for clinching the ends of said staple around the lower surface of the compressed work assembly, said stitching head thereafter withdrawing said former and said staple driving means from said clinching mechanism and said clinched staple, and means effective incident to said withdrawal of said former for moving said two elements of said clinching mechanism away from each other, whereby the clinched staple encircling said work assembly becomes embedded in the walls of the work assembly as the compressible material therein expands to its normal position.

12. In a machine for forming metal cleats comprising a head, an anvil arm having a free end extending beneath said head, clamping means carried by the free end of said arm having a first position for supporting a work assembly and operative to a second position to clamp the sides of the work assembly, and means including a cleat former and a cleat driver movable toward said clamping means and carried by said head for operating said clamping means from said first to said second position and for encircling the clamped work assembly with a cleat.

13. In a machine for forming metal cleats comprising a head, an anvil arm having a free end extending beneath said head, clamping means carried by the free end of said arm having a first position for supporting a work assembly and operative to a second position to clamp the sides of the work assembly, means including a cleat former and a cleat driver movable toward said clamping means and carried by said head for operating said clamping means from said first to said second position and for encircling the clamped work assembly with a cleat, and means for thereafter restoring said clamping means to said first position.

ELMO P. CRIM.

REFERENCES CITED

The following references are of record in the file of this patent:

UNITED STATES PATENTS

| Number | Name | Date |
| --- | --- | --- |
| 116,012 | Beecher | June 20, 1871 |
| 1,111,403 | Ohl, Jr. | Sept. 22, 1914 |
| 1,493,075 | Hirschhorn | May 6, 1924 |
| 1,908,981 | Hicks | May 16, 1933 |
| 1,963,306 | Maynard | June 19, 1934 |